US009887944B2

(12) United States Patent
Chang et al.

(10) Patent No.: US 9,887,944 B2
(45) Date of Patent: *Feb. 6, 2018

(54) DETECTION OF FALSE MESSAGE IN SOCIAL MEDIA

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,297

(22) Filed: Aug. 25, 2015

(65) Prior Publication Data

US 2016/0164812 A1 Jun. 9, 2016

Related U.S. Application Data

(63) Continuation of application No. 14/559,508, filed on Dec. 3, 2014.

(51) Int. Cl.
*H04L 29/06* (2006.01)
*H04L 12/58* (2006.01)
(Continued)

(52) U.S. Cl.
CPC .............. *H04L 51/12* (2013.01); *G06N 7/005* (2013.01); *H04L 51/32* (2013.01);
(Continued)

(58) Field of Classification Search
CPC . H04L 63/1408; H04L 63/1441; H04L 67/22; H04L 51/12; H04L 51/32;
(Continued)

(56) References Cited

U.S. PATENT DOCUMENTS 7,899,866 B1   3/2011  Buckingham et al.
8,046,832 B2 * 10/2011  Goodman ............ G06Q 10/107
                                                        709/206

(Continued)

OTHER PUBLICATIONS

Juan Martinez-Romo & Lourdes Araujo, "Detecting malicious tweets in trending topics using a statistical analysis of language", 2012, Expert Systems with Applications 40 (2013), pp. 2992-3000.*

(Continued)

*Primary Examiner* — Edward Zee
*Assistant Examiner* — Chi Nguy
(74) *Attorney, Agent, or Firm* — Scully, Scott, Murphy & Presser, P.C.; Jeffrey Kelly (57) ABSTRACT

Communications in social networking environment are monitored and patterns of sharing a communication are identified. The patterns of sharing are compared to one or more criteria. A first probability of false information in the communication is determined. Responsive to determining the first probability of false information in the communication exceeding a first threshold, an additional validation of the communication is performed. A second probability that the communication contains false information is determined based on the additional validation. Responsive to determining that the second probability indicative of the communication containing false information exceeds a second threshold, an action to reduce dissemination of the communication may be performed.

7 Claims, 4 Drawing Sheets (51) Int. Cl.
*G06N 7/00* (2006.01)
*H04L 29/08* (2006.01)

(52) U.S. Cl.
CPC ...... *H04L 63/1408* (2013.01); *H04L 63/1441* (2013.01); *H04L 67/10* (2013.01); *H04L 67/1097* (2013.01); *H04L 67/22* (2013.01); *H04L 67/306* (2013.01)

(58) Field of Classification Search
CPC ... H04L 67/10; H04L 67/1097; H04L 67/306; G06N 7/005; H05L 51/12; H05L 51/32
USPC .......................................................... 726/22
See application file for complete search history.

(56) References Cited

U.S. PATENT DOCUMENTS

| | | | |
|---|---|---|---|
| 8,150,779 | B1 | 4/2012 | Gauvin |
| 2012/0124664 | A1* | 5/2012 | Stein ................. G06F 15/16 726/22 |
| 2013/0018823 | A1 | 1/2013 | Masood |
| 2013/0091223 | A1 | 4/2013 | DeLuca et al. |
| 2013/0198196 | A1 | 8/2013 | Myslinski |
| 2015/0120583 | A1* | 4/2015 | Zarrella .................. G06Q 50/01 705/317 |
| 2015/0256505 | A1 | 9/2015 | Kato |
| 2015/0310132 | A1* | 10/2015 | Derstadt ........... G06F 17/30943 707/692 |

OTHER PUBLICATIONS

List of IBM Patents or Patent Applications Treated As Related dated Nov. 11, 2015, 2 pages.

www.symantec.com/security_response/glossary/define.jsp?letter=h&word=hoaxes, "hoaxes", Printed on Sep. 8, 2014, 1 page, Symantec Corporation.

Christensen, B. M., http://www.hoax-slayer.com/free-heart-surgery-children-share.shtml, "Free Heart Surgery for Children—Facebook Share", Last updated on Oct. 19, 2011, First published Oct. 19, 2011, 5 pages.

http://us.norton.com/antivirus, Norton by Symantec, Printed on Dec. 3, 2014, 2 pages.

http://www.symantec.com/about/news/resources/press_kits/securityintelligence/media/SSR-TechOV.pdf, Symantec Security Response—Technology Overview, Updated Feb. 2006, 4 pages.

Office Action dated Jul. 19, 2016 received in parent U.S. Appl. No. 14/559,508, 16 pages.

Office Action dated Feb. 13, 2017 received in parent U.S. Appl. No. 14/559,508, 27 pages.

Office Action dated Aug. 14, 2017 received in parent U.S. Appl. No. 14/559,508, 19 pages.

* cited by examiner

DETECTION OF FALSE MESSAGE IN SOCIAL MEDIA

FIELD

The present application relates generally to computers, and computer applications, online communications, and more particularly to detecting false messages in social media and/or social networking.

BACKGROUND

Online social networking is used widely for online communications among people. In social networking environment, practically anyone can post messages or content, and it is not easy to tell whether those messages or content are authentic and credible. For example, some content presented in social networking environment may be false, which can confuse the users and misguide them.

BRIEF SUMMARY

A method of reducing dissemination of false information in a social networking environment, in one aspect, may comprise monitoring communications in social networking environment. The method may also comprise identifying patterns of sharing a communication of the monitored communications. The method may further comprise comparing the patterns of sharing to one or more criteria. The method may also comprise determining a first probability of false information in the communication. The method may further comprise, responsive to determining the first probability of false information in the communication exceeding a first threshold, performing an additional validation of the communication. The method may also comprise determining a second probability that the communication contains false information based on the additional validation. The method may further comprise, responsive to determining that the second probability indicative of the communication containing false information exceeds a second threshold, performing an action to reduce dissemination of the communication.

A system for reducing dissemination of false information in social networking environment, in one aspect, may comprise a memory and a hardware processor connected to the memory. The hardware processor may be operable to monitor communications in a social networking environment, the communications, the communications received from one or more user devices and stored in the memory. The hardware processor may be further operable to identify patterns of sharing a communication of the monitored communications. The hardware processor may be further operable to compare the patterns of sharing to one or more criteria. The hardware processor may be further operable to determine a first probability of false information in the communication. Responsive to determining the first probability of false information in the communication exceeding a first threshold, the hardware processor may be further operable to perform an additional validation of the communication. The hardware processor may be further operable to determine a second probability that the communication contains false information based on the additional validation. Responsive to determining that the second probability indicative of the communication containing false information exceeds a second threshold, the hardware processor may be further operable to perform an action to reduce dissemination of the communication.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method and system may be provided that detect a false message or messages in a social network communication, and block the message(s) automatically, for example, at an early stage of the communication. Blocking such false messages at an early stage prevents a wide spread sharing of possible false messages on social networking environment. The term messages is used in the present disclosure to broadly refer to content, e.g., that can be posted via social networking environment. The content may include text, images, voice, and other media that may be posted or communicated, e.g., in the social networking environment.

Examples of social networking environment include document management facility, a social networking site, a shared repository, a file hosting service allowing file sharing, electronic mail (email), a voice response system, a forum, wiki, an activity stream, and others.

For example, social networking sites allow users to create an online profile for themselves, make connections and/or relationships online, and socialize with others, for example, using social media tools such as blogs, video, images, messaging, etc., to converse and share content online, for example, via computer or communication networks.

A forum refers to a discussion area on web sites, e.g., for conversing on line. Users can post messages or comments on messages on a particular forum, e.g., a web site. Messages are posted asynchronously, e.g., independent of time and place.

A wiki refers to a set of web pages that is edited collaboratively. A wiki application (web application) allows users to add, modify or delete content in collaboration with others.

An activity stream is a list of activities performed by an individual on a web site or a social web application.

In one aspect, a method of the present disclosure detects a possible false message posted or presented on social networking environment, e.g., an online social network site or another, based on a predefined pattern of sharing of the message. The method, in another aspect, predicts a degree of authenticity of the message. Yet in another aspect, the method may block the message for sharing and may send the notification about the false information, if it is determined that the message is inappropriate and/or false.

To detect a possible false message, a method of the present disclosure in one embodiment may identify the messages that are shared among different people and/or different geographical regions. Based on a predefined rule, the method may perform further analysis on the content. For example, the predefined rule can be the total number of sharing, liking, commenting, or another functionality of a social network, for example, occurring within a period of time, in a particular geographical region, and/or particular community. Briefly, "like" or "liking" refers to a functionality that allows users to express their approval of content, for example, recommend content or show agreement with the content. In the present disclosure, the term sharing is used to broadly refer to sharing, liking, commenting, and/or another functionality that allow users to see and use the content.

Based on a threshold number of count, e.g., of the sharing, liking, commenting or another, the method may consider the message for further validation. The method may extract information, metadata, semantic content about the message and associated comments. The method may perform further investigation such as an Internet search from the identified information of the message. The method may consider the search results and validate the posted message against the search results. If the method finds that the message is inappropriate and has a poor degree of authenticity, the method may automatically block the message for sharing. The method may also request the original submitter to provide a reference of the message. The method may also notify other users about the above information.

Figure 1:
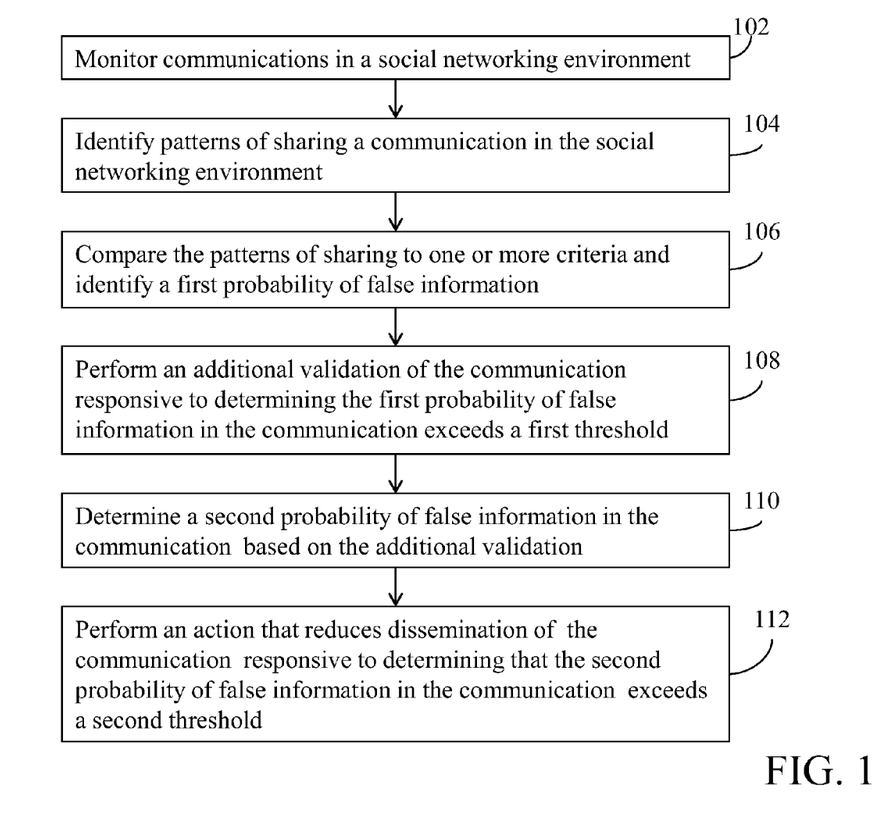
FIG. 1 is a flow diagram illustrating a method of the present disclosure in one embodiment.

FIG. 1 is a flow diagram illustrating a method of the present disclosure in one embodiment. The method for example reduces dissemination of false information in social networking environment. Social networking environment may include one or more of document management facility, a social networking site, a shared repository, a file hosting service allowing file sharing, email, a voice response system, a forum, wiki, an activity stream, and others.

At 102, the method may include monitoring communications in a social networking environment. For example, data entered on a user's device via a user interface of a social networking software, platform or like tool running on a hardware processor, which may be stored in memory or another storage device by the social networking software, platform or like tool, may be received or retrieved. Such receiving may be performed periodically or in real time as the data is entered and/or stored.

For example, the social networking application or another application may detect content posted on the site and monitor for a number of sharing of the content among users. Once any content is posted in social networking site and gains at least a threshold limit of sharing, software or an application installed in social networking site may perform contextual analysis of the posted content. Contextual analysis may include image object analysis, text extraction from image, keyword extraction from text, video content analysis, etc. The software may perform semantic analysis to identify the information content, e.g., search the Internet to find any authentic information sources associated with the content. The software may also search location information of the content, and may perform a survey in that locality to validate the content. The survey can be performed by sending information to the social network user of that locality, and asking for feedback.

Examples of communications may include, but are not limited to, postings, documents or files (e.g., in hypertext markup language (html) or other formats), page, picture, video, audio recording, email message, and others.

At 104, the method may include identifying patterns of sharing a communication in the social networking environment. A pattern of sharing may include the speed of sharing (e.g., number of sharing in a time interval), locality of sharing, comparing the profile of the users who are sharing, time of sharing, and other attributes with respect to the sharing. Such patterns may be used in predicting a degree of abnormality in the content of the communication, e.g., that is monitored at 102.

At 106, the method may include comparing the patterns of sharing to one or more criteria. The criteria may have one or more predefined rules related to the pattern of sharing for determining whether there is a first probability that the communication contains false information. A social network server may create such rules and store them in a server. The rules may specify that the content be shared among certain groups in a locality and a threshold limit for the number of sharing. For example, the first probability may be identified if the communications fall within the rules, in this example, content is shared among the specified group in the specified locality. In this case, if it is determined that the number of sharing exceeds the threshold limit associated with this rule, the content validation may be triggered.

At 108, responsive to determining the first probability of false information in the communication exceeding a first threshold, the method may include performing an additional validation of the communication. The first threshold may be a predefined value, and may be configurable, for example, by a system administrator of the social networking tool or another. The first threshold, for example, may also change dynamically.

Performing additional validation, for example, may include performing an Internet search or another database search regarding the information, and analyzing results of the search for evidence of correctness, scam or spam and hoax. In one embodiment, information from the content of the communication and associated comments may be used to perform such search. For example, utilizing a natural language processing (NLP) technique, data content (e.g., keywords and phrases) may be extracted from the communication and associated comments, metadata describing the communication may be extracted, and semantic content may be extracted.

To perform an Internet search, a search engine may be invoked with keywords or phrases extracted from the communication as parameters. Similarly, database search may be performed using one or more database system query languages with search parameters.

Other examples of additional validation may include, but are not limited to, sending the communication to one or more validation services such as hoax validation services for determining whether there is a second probability that the communication contains false information, checking with the entities or localities mentioned in the communication to validate the information and check on the authenticity of the information. For example, if the content of the communication contains information about a certain institution, a request may be made directly to that institution to validate the authenticity.

At 110, the additional validation determines a second probability that the communication contains false information. For example, the Internet search may produce results that may be inconsistent with the content contained in the communication, a validation service may return a result that the content has certain percentage of likelihood that the information is not accurate, an entity or locality may not be able to authenticate the information about itself contained in the communication.

In one aspect, the result returned from the additional validation may be compared to a second threshold. For example, the result may be normalized into a normalized metric value as a second probability and compared to the second threshold.

At 112, responsive to determining that the second probability indicative of the communication containing false information exceeds a second threshold, the method may include performing an action to reduce dissemination the communication (e.g., determined to have false information). The second threshold may be a predefined value, and may be configurable, for example, by a system administrator of the social networking tool or another. The second threshold, for example, may also change dynamically.

Examples of actions that may be performed to reduce dissemination of the information determined to be false may include, but are not limited to, one or more of blocking the entire message or portions thereof determined to be false, erasing the entire message or portions thereof determined to be false, replacing the entire message or portions thereof determined to be false, notifying one or more social networking users, updating or annotating the communication (e.g., posting on the social network or social media that the communication may be not accurate), providing a option for consumers or users to respond (e.g., by providing a user interface element such as an input area where the users can enter responses), and requesting additional information such as the origin of the message.

Figure 2:
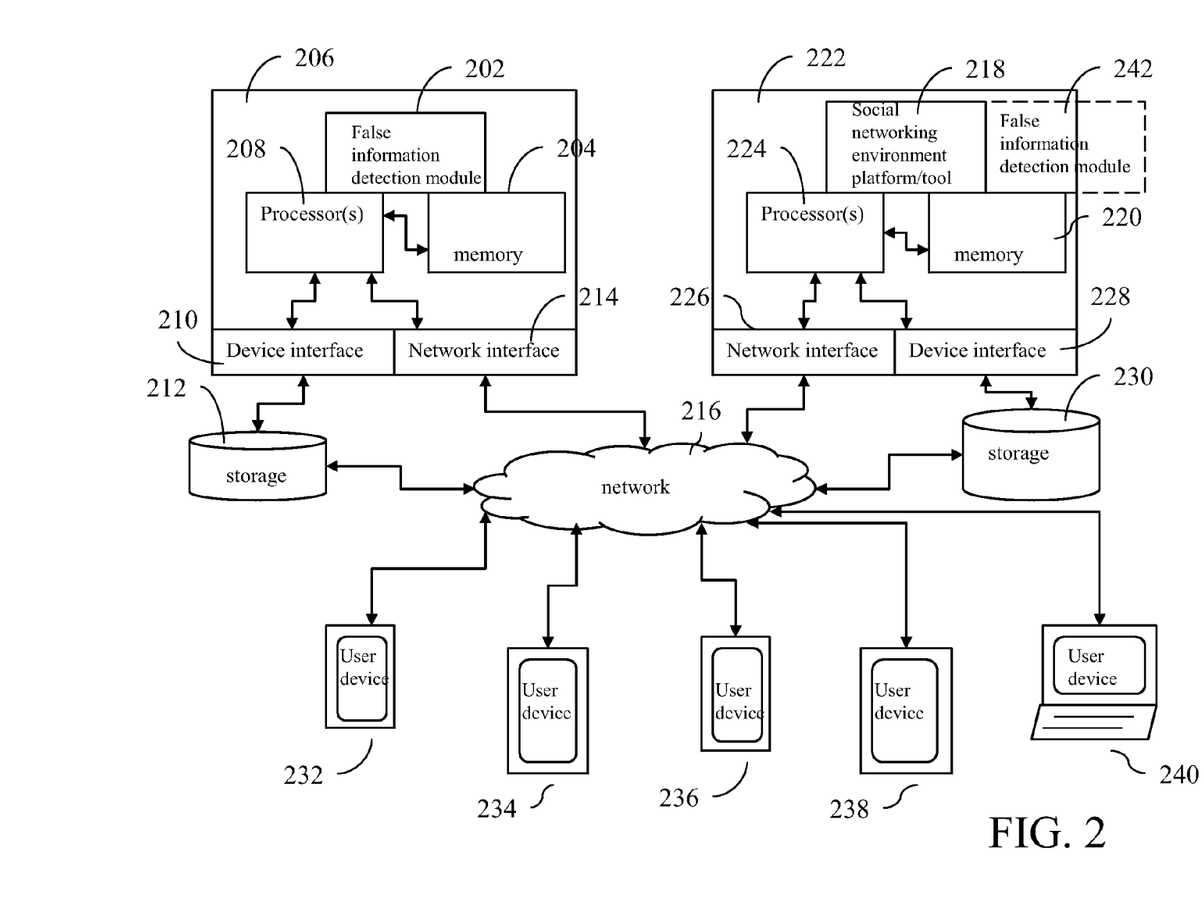
FIG. 2 is a system diagram illustrating components of the present disclosure in one embodiment.

FIG. 2 is a system diagram illustrating components of the present disclosure in one embodiment. A false information detection module 202 may be computer executable module or code, e.g., residing in memory 204 of a computer system 206, and/or running on one or more hardware processors 208 such as a central processing unit, field programmable gate array, and/or another hardware processor of a computer system 206. A computer system 206 that the false information detection module 202 resides or executes in may also include one or more device interfaces 210 for communicating with one or more devices (e.g., a storage device 212) and communication or network interface 214 for communicating with other devices via one or more networks 216. The storage device 212 may be a local storage device (e.g., accessible directly via a device interface 210), or a remote storage device (e.g., accessible via a network interface 214).

Social networking environment platform or tool 218 may be a computer executable module or code, e.g., residing in memory 220 of a computer system 222, and/or running on one or more hardware processors 224 such as a central processing unit, field programmable gate array, and/or another hardware processor of a computer system 222. A computer system 222 that the social networking environment platform or tool 218 resides or executes in may also include a communication or network interface 226 for communicating with other devices via one or more networks 216, and one or more device interfaces 228 for communicating with one or more devices (e.g., a storage device 230). The storage device 230 may be a local storage device (e.g., accessible directly via a device interface 228), or a remote storage device (e.g., accessible via a network interface 226).

In one aspect, the false information detection module 202 may run on a separate computer system from the computer system that is running the social networking environment platform or tool 218. In another aspect, the false information detection module 242 may run on the same computer system that is running the social networking environment platform or tool 218. Yet in another aspect, the false information detection module 242 may be an added component of the social networking environment platform or tool 218.

The social network environment platform or tool 218 enables one or more users to socialize (e.g., communicate) online with one another. For example, by registering or creating an account with the social network environment platform or tool 218, the users can post one or more messages, comment on posted messages, indicate their approval of the messages (e.g., "like" the messages), and/or otherwise share the messages on an online place that that social network environment platform or tool 218 provides. For instance, users using user devices 232, 234, 236, 238, 240, etc., may perform such tasks, e.g., via a user interface that is associated with the social network environment platform or tool 218. Examples of social networking environment platform or tool 218 include those that implement document management facility, a social networking site, a shared repository, a file hosting service allowing file sharing, email, a voice response system, a forum, wiki, an activity stream, and others.

The social networking environment platform or tool 218 receives messages or posting from the user devices (e.g., 232, 234, 236, 238, 240) and may store them in memory 220 or a storage device 230. The postings appear (e.g., displayed) on a wall (e.g., web page) of a user and any other users (e.g., friends, connections) that may have access to the information posted by this user. For instance, a user via a user interface associated with this social networking environment platform or tool 218 that is running on a user device (e.g., 232) may post a message, e.g., enter text, video, picture, etc, on the user interface. The message is received at the social networking environment platform or tool 218, and saved. The posting may be accessible or displayed for sharing on user devices (e.g., 234, 236, 238, 240) of users who have connections (e.g., friends list) with this user (e.g., 232).

The false information detection module (e.g., 202 or 242) may monitor communications (e.g., such postings) in a social networking environment. Examples of communications may include, but are not limited to, postings, documents, files, page, picture, hypertext markup language (html), video, audio recording, email message, and others. For example, the false information detection module (e.g., 202 or 242) may monitor communications by receiving or retrieving user postings (communications) from memory 220 or storage device 230.

The false information detection module (e.g., 202 or 242) identifies patterns of sharing a communication in the social networking environment.

The false information detection module (e.g., 202 or 242) compares the patterns of sharing to one or more criteria. The criteria may have one or more predefined rules related to patterns of sharing indicative of a first probability that the communication contains false information.

A social network server may create such rules and store them in a server, e.g., 212 and/or 214. The rules may specify that the content be shared among certain groups in a certain locality. There may be a threshold limit for the number of sharing associated with this rule. For example, the first probability may be identified if the communications fall within the rules, in this example, if a communication content is shared among the specified group in the specified locality. In this case, if the number of sharing exceeds the threshold limit associated with this rule, the content validation may be triggered.

Responsive to determining the first probability of false information in the communication exceeding a first threshold, the false information detection module (e.g., 202 or 242) performs an additional validation of the communication. The first threshold may be a predefined value, and may be configurable, for example, by a system administrator of the social networking tool or another. The first threshold, for example, may also change dynamically.

To perform additional validation, for example, the false information detection module (e.g., 202 or 242) may perform an Internet search or another database search regarding the information, and analyzing results of the search for evidence of correctness, scam or spam and hoax. In one embodiment, information from the content of the communication and associated comments may be used to perform such search. For example, the false information detection module (e.g., 202 or 242) may utilize a natural language processing (NLP) technique, and extract data content (e.g., keywords and phrases) from the communication and associated comments, metadata describing the communication, and semantic content.

The keywords and/or phrases extracted from the communication content may be used as parameters in performing an Internet search or another search. For example, to perform an Internet search, the false information detection module (e.g., 202 or 242) may invoke a search engine with keywords or phrases as parameters. Similarly, the false information detection module (e.g., 202 or 242) may perform a database search using one or more database system query languages with search parameters.

As other examples of additional validation, the false information detection module (e.g., 202 or 242) may send the communication to one or more validation services such as hoax validation services for determining whether there is a second probability that the communication contains false information, check with the entities or localities mentioned in the communication to validate the information and check on the authenticity of the information. For example, if the content of the communication contains information about a certain institution, false information detection module (e.g., 202 or 242) may make a request directly to that institution to validate the authenticity, e.g., by sending an electronic mail or by another communication.

The false information detection module (e.g., 202 or 242), based on the additional validation, determines a second probability that the communication contains false information. For example, the Internet search may produce results that may be inconsistent with the content contained in the communication, a validation service may return a result that the content has certain percentage of likelihood that the information is not accurate, an entity or locality may not be able to authenticate the information about itself contained in the communication.

In one aspect, the result returned from the additional validation may be compared to a second threshold. For example, the result may be normalized into a normalized metric value as a second probability and compared to the second threshold.

Responsive to determining that the second probability indicative of the communication containing false information exceeds a second threshold, the false information detection module (e.g., 202 or 242) performs an action to reduce dissemination the communication (e.g., determined to have false information). The second threshold may be a predefined value, and may be configurable, for example, by a system administrator of the social networking tool or another. The second threshold, for example, may also change dynamically.

Examples of actions that the false information detection module (e.g., 202 or 242) may perform to reduce dissemination of the information determined to be false may include, but are not limited to, one or more of blocking the entire message or portions thereof determined to be false, erasing the entire message or portions thereof determined to be false, replacing the entire message or portions thereof determined to be false, notifying one or more social networking users, updating or annotating the communication (e.g., posting on the social network or social media that the communication may be not accurate), providing a option for consumers or users to respond (e.g., by providing a user interface element such as an input area where the users can enter responses), and requesting additional information such as the origin of the message.

The first probability and/or the second probability may represent a value such as a confidence level that the information is false. Such values (e.g., the first probability, the second probability, the confidence level) may be displayed or presented with the message to one or more users (e.g., via a user interface running on devices).

Figure 3:
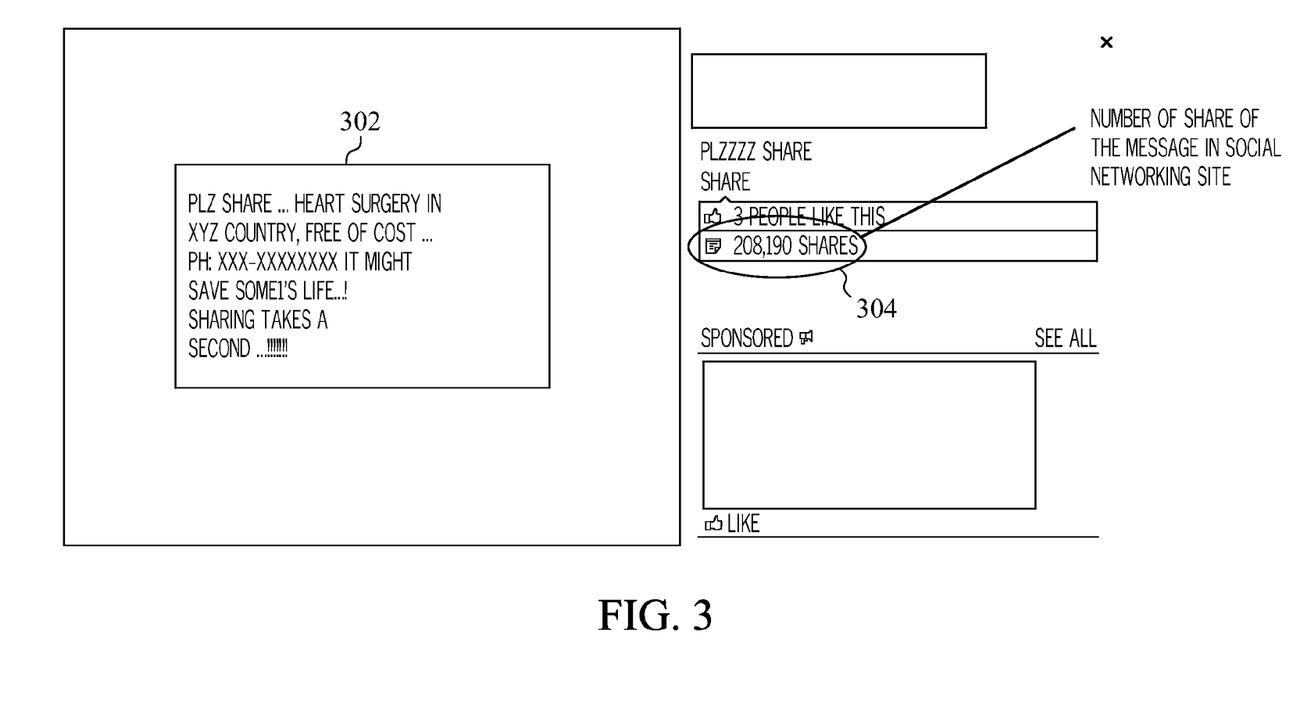
FIG. 3 is a sample message posting on a user interface of a social networking environment.

FIG. 3 is a sample message posting on a user interface of a social networking environment, e.g., a social network site. The user interface shows a posted message 302 on a user's social networking site web page. The user interface also shows the number of likes for this message and the number of shares 304.

Figure 4:
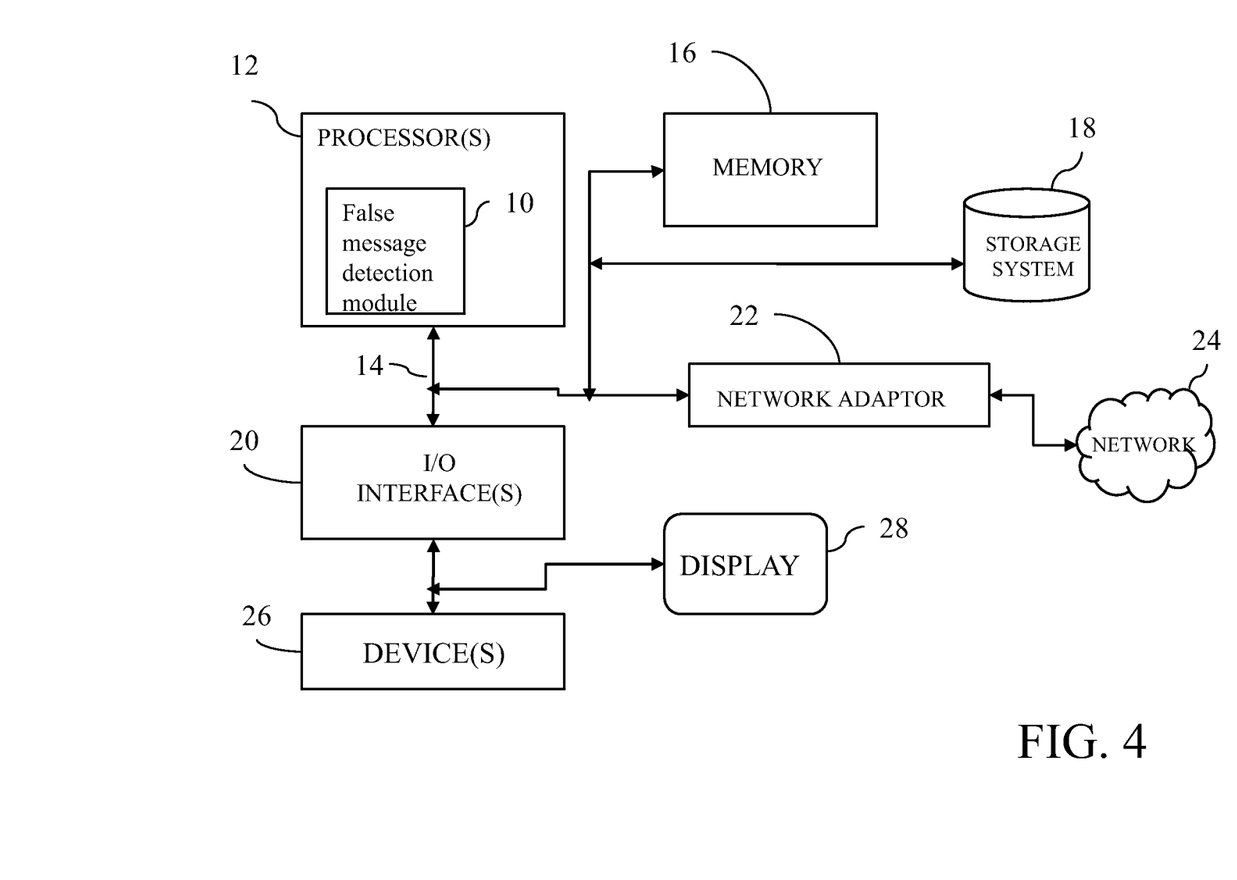
FIG. 4 illustrates a schematic of an example computer or processing system that may implement a false message detection system in one embodiment of the present disclosure.

FIG. 4 illustrates a schematic of an example computer or processing system that may implement a false message detection system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of reducing dissemination of false information in a social networking environment, comprising:
   monitoring communications in social networking environment;
   identifying patterns of sharing a communication of the monitored communications;
   comparing the patterns of sharing to criteria, the criteria comprising a defined number of shares, a defined number of likes, and a defined group and geographic locality of the defined group sharing content posted in the social networking environment and liking the content;
   determining a first probability of false information in the communication by determining that the patterns of sharing indicates a number of sharing by the defined group in the geographic locality is greater than the defined number of shares, and that a number likes by the defined group in the geographic locality greater than the defined number of likes;
   responsive to determining the first probability of false information in the communication, performing an additional validation of the communication;
   determining a second probability that the communication contains false information based on the additional validation; and
   responsive to determining that the second probability indicative of the communication containing false information exceeds a second threshold, performing an action to reduce dissemination of the communication.

2. The method of claim 1, wherein the action comprises one or at least one of blocking the communication from being transmitted, erasing the communication, replacing the communication, and notifying one or more users that shared the communication.

3. The method of claim 1, wherein said performing of the additional validation of the communication comprises:
   at least one of performing an Internet search and performing a database search based on information extracted from the communication; and
   analyzing results of one or more of the Internet search or the database search or both.

4. The method of claim 3, wherein the information extracted from the communication comprises at least one of keywords parsed from content of the communication using a natural language processing technique, metadata associated with the communication, one or more of keywords parsed from a comment responding to the communication, and metadata associated with the comment.

5. The method of claim 1, wherein the social networking environment comprises at least one of a document management facility, a social networking site, a shared repository, a file sharing service, a voice response system, an Internet discussion forum, a wiki, and an activity stream or combinations thereof.

6. The method of claim 1, wherein the communications comprises at least one of an online posting, a computer file, a web page, a picture, a video, audio recording, and an email.

7. The method of claim 1, wherein the action comprises requesting additional information from an originator of the communication.

* * * * *